(12) United States Patent  
Orson et al.

(10) Patent No.: US 8,820,682 B2  
(45) Date of Patent: Sep. 2, 2014

(54) HIGH PRIVACY PASSENGER AIRCRAFT CABIN ARRANGEMENT

(71) Applicant: Zodiac Seat Shells US LLC, Santa Maria, CA (US)

(72) Inventors: Ben Orson, Shell Beach, CA (US); Elijah Dobrusin, Santa Maria, CA (US)

(73) Assignee: Zodiac Seat Shells US LLC, Santa Maria, CA (US)

( * ) Notice: Subject to any disclaimer, the term of this patent is extended or adjusted under 35 U.S.C. 154(b) by 36 days.

(21) Appl. No.: 13/665,476

(22) Filed: Oct. 31, 2012

(65) Prior Publication Data

US 2013/0105627 A1 May 2, 2013

Related U.S. Application Data

(60) Provisional application No. 61/554,410, filed on Nov. 1, 2011.

(51) Int. Cl.
*B64D 11/00* (2006.01)

(52) U.S. Cl.
USPC ............. 244/118.5; 244/118.6; 244/119

(58) Field of Classification Search
USPC ............. 244/118.6, 118.5, 119, 120, 122 AH
See application file for complete search history.

(56) References Cited

U.S. PATENT DOCUMENTS

| | | | | |
|---|---|---|---|---|
| 5,024,398 A | * | 6/1991 | Riedinger et al. | 244/118.5 |
| 5,957,407 A | * | 9/1999 | Auestad | 244/118.6 |
| 6,152,400 A | * | 11/2000 | Sankrithi et al. | 244/118.5 |
| 6,676,079 B2 | * | 1/2004 | Takeshima | 244/118.5 |
| 6,696,979 B2 | * | 2/2004 | Manten et al. | 340/945 |
| 6,857,598 B2 | * | 2/2005 | Adamson et al. | 244/15 |
| 7,178,854 B2 | * | 2/2007 | Ichinose et al. | 296/146.2 |
| 7,178,954 B2 | | 2/2007 | Blechschmidt | |
| 8,469,311 B2 | * | 6/2013 | Saint-Jalmes et al. | 244/118.5 |
| 2006/0049310 A1 | * | 3/2006 | Park et al. | 244/118.5 |
| 2010/0219292 A1 | * | 9/2010 | Saint-Jalmes et al. | 244/118.5 |
| 2011/0233333 A1 | * | 9/2011 | Papke | 244/118.6 |
| 2013/0068890 A1 | * | 3/2013 | Boren | 244/137.2 |

FOREIGN PATENT DOCUMENTS

WO 0228712 A1 4/2002

OTHER PUBLICATIONS

International Search Report and Written Opinion of the International Searching Authority, issued Feb. 21, 2013, in related PCT Application No. PCT/US2012/062815.

* cited by examiner

*Primary Examiner* — Christopher P Ellis
*Assistant Examiner* — Medhat Badawi
(74) *Attorney, Agent, or Firm* — Kilpatrick Townsend & Stockton LLP; Tiffany L. Williams, Esq.; Dean W. Russell, Esq.

(57) ABSTRACT

An aircraft that includes a cabin that has a floor, side walls, a ceiling and an interior, a first class section positioned in the interior that includes a longitudinally extending first aisle extending therethrough, a first door positioned fore of the first class section, an economy class section positioned in the interior and aft of the first class section, and a longitudinally extending second aisle that extends parallel to the first aisle and that does not extend through the first class section. An economy class passenger that enters through the first door travels down the second aisle to enter the economy class section and never enters the first class section.

15 Claims, 6 Drawing Sheets

HIGH PRIVACY PASSENGER AIRCRAFT CABIN ARRANGEMENT

This application claims the benefit of U.S. Provisional Application No. 61/554,410, filed Nov. 1, 2011, which is herein incorporated by reference in its entirety.

FIELD OF THE INVENTION

The present invention relates to an aircraft cabin arrangement, and more particularly to a high privacy passenger aircraft cabin arrangement that includes a separate entrance to the first class cabin.

BACKGROUND OF THE INVENTION

In standard aircraft cabin arrangements, if the first class seating (P class) is located at the front of the aircraft, passengers going to the business and economy seating classes often must walk through the first class section. Accordingly, a need exists for a seating arrangement where business class (J class) and economy class (Y class) passengers do not need to walk through the first class section to get to their seats.

SUMMARY OF THE PREFERRED EMBODIMENTS in accordance with a first aspect of the present invention there is provided an aircraft that includes a cabin that has a floor, side walls, a ceiling and an interior, a first class section positioned in the interior that includes a longitudinally extending first aisle extending therethrough, a first door positioned fore of the first class section, an economy class section positioned in the interior and aft of the first class section, and a longitudinally extending second aisle that extends parallel to the first aisle and that does not extend through the first class section. An economy class passenger that enters through the first door travels down the second aisle to enter the economy class section and never enters the first class section. In a preferred embodiment, the aircraft includes a longitudinally extending wall that extends from the floor to the ceiling and that separates the second aisle from the first class section. Preferably, the wall includes a vertically extending floor portion, an offset portion, and a vertically extending ceiling portion and the ceiling includes an oxygen mask compartment. Preferably, the floor portion of the longitudinally extending wall defines a first vertical plane and the ceiling portion defines a second vertical plane, and the first vertical plane extends through the oxygen mask compartment and the second vertical plane does not extend through the oxygen mask compartment.

In accordance with another aspect of the present invention there is provided an aircraft that includes a cabin that has a floor, side walls, a ceiling and an interior, a first class section positioned in the interior that includes a longitudinally extending first aisle extending therethrough, a business class section positioned in the interior that includes a longitudinally extending second aisle extending therethrough that is parallel to the first aisle and does not extend through the first class section, a first door positioned fore of the first class section and the business class section, and an economy class section positioned in the interior and aft of the first class section and the business class section. A first class passenger that enters through the first door travels down the first aisle to enter the first class section. A business class passenger that enters through the first door travels down the second aisle to enter the business class section, and an economy class passenger that enters through the first door travels down the second aisle to enter the economy class section.

In accordance with another aspect of the present invention there is provided an aircraft that includes a door through which passengers enter the aircraft, a secluded first class section, an economy class section positioned in the interior, and a grand entrance positioned between the door and the first class section. The grand entrance includes a frame and a vestibule that comprises a walkway defined by opposing walls, and wherein one or both of the frame and the opposing walls include decorative functional elements thereon.

In a preferred embodiment, the present invention provides a separation between two sections of an aircraft cabin so that passengers in the preferred section are never disturbed by the remainder of the passengers on the aircraft. In other words, the first class section is arranged within the layout of the cabin such that during normal flights, business and economy class passengers (except for in the case of an emergency) do not have a need or reason to pass through the first class section at any time. It allows the first class section to be configured such that boarding passengers, unless allocated a seat in this section, never enter it. It allows the aforementioned circumstances to be maintained regardless of which door on the aircraft any of the classes boards from (assuming that passengers board on the left hand or port side of the aircraft only). Accordingly, whether passengers enter toward the front of the aircraft or from the rear of the aircraft, non-first class passengers do not enter the first class section.

This arrangement allows first class to remain truly an exclusive space reserved for a fortunate few. It also provides opportunities for the entrances to the first class section to be designed as "grand entrances" rather than plain thresholds marked only with a curtain.

The invention, together with additional features and advantages thereof, may be best understood by reference to the following description.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "upper," "lower," "side," "short," "long," "up," "down," and "below" used herein are merely for ease of description and refer to the orientation of the components as shown in the figures. It should be understood that any orientation of the components described herein is within the scope of the present invention.

Figure 1:
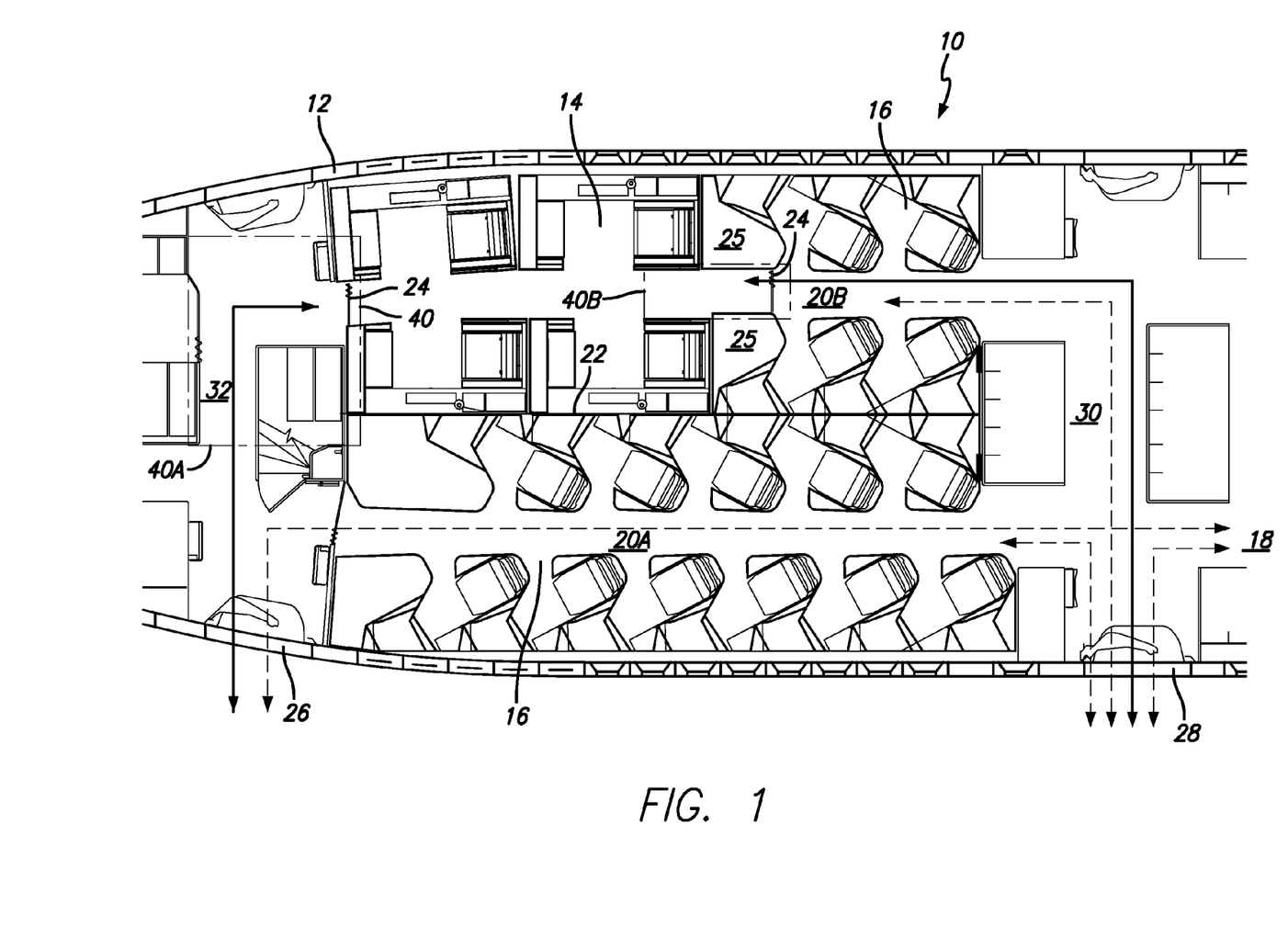
FIG. 1 is a top plan view of an aircraft with a separate first class seating section in accordance with a preferred embodiment of the present invention.

Referring now to the drawings, which are for purposes of illustrating the present invention and not for purposes of limiting the same, FIG. 1 shows a preferred embodiment of an aircraft seating arrangement within the cabin 10 of an aircraft 12 that provides a boarding path for the business and economy class passengers that does not go through the first class seating section 14. It will be understood that the "secluded" class section does not have to be first class, but can instead be a different class. However, in a preferred embodiment, the secluded class will typically be first class. As is shown in FIG. 1, the boarding path for business and/or economy passengers is indicated by arrows with dashed lines and the boarding path for first class passengers is indicated by arrows with solid lines. It will be understood that passengers who board along a certain path will generally exit along the same path. This is indicated by arrows with arrow heads on both ends. However, the exit paths are not limiting on the present invention. Generally, the objective of providing a boarding path for business and economy class passengers that does not go through the first class seating section 14 is achieved with an arrangement of interior walls 22, curtains 24 and/or bulkheads 25.

The cabin 10 includes the first class section 14, business class section 16 (having port and starboard sides), and an economy class section 18 that each include a plurality of seat rows. As is shown, in this exemplary embodiment, the first class section 14 includes two seat rows and four total seats and the business class section 16 includes six rows that include fifteen total seats. The rows extend laterally across the cabin 10 between port and starboard sides. The configuration of rows and seats form two generally parallel aisles referred to generally herein as an aisle 20 or specifically as the port aisle 20a and the starboard aisle 20b.

The economy class section 18 rows of seats are not shown. It will be understood that an aircraft cabin may include more or less rows or columns and that the number of rows or columns shown herein are not limiting, but are shown only for illustrative purposes. Furthermore, the types of seats shown in the drawings are not limiting. Any type of seating is within the scope of the present invention. It will be appreciated by those skilled in the art that partial rows are possible to take into account placement of bulkheads, meal service equipment, restrooms and the like.

Figure 4:
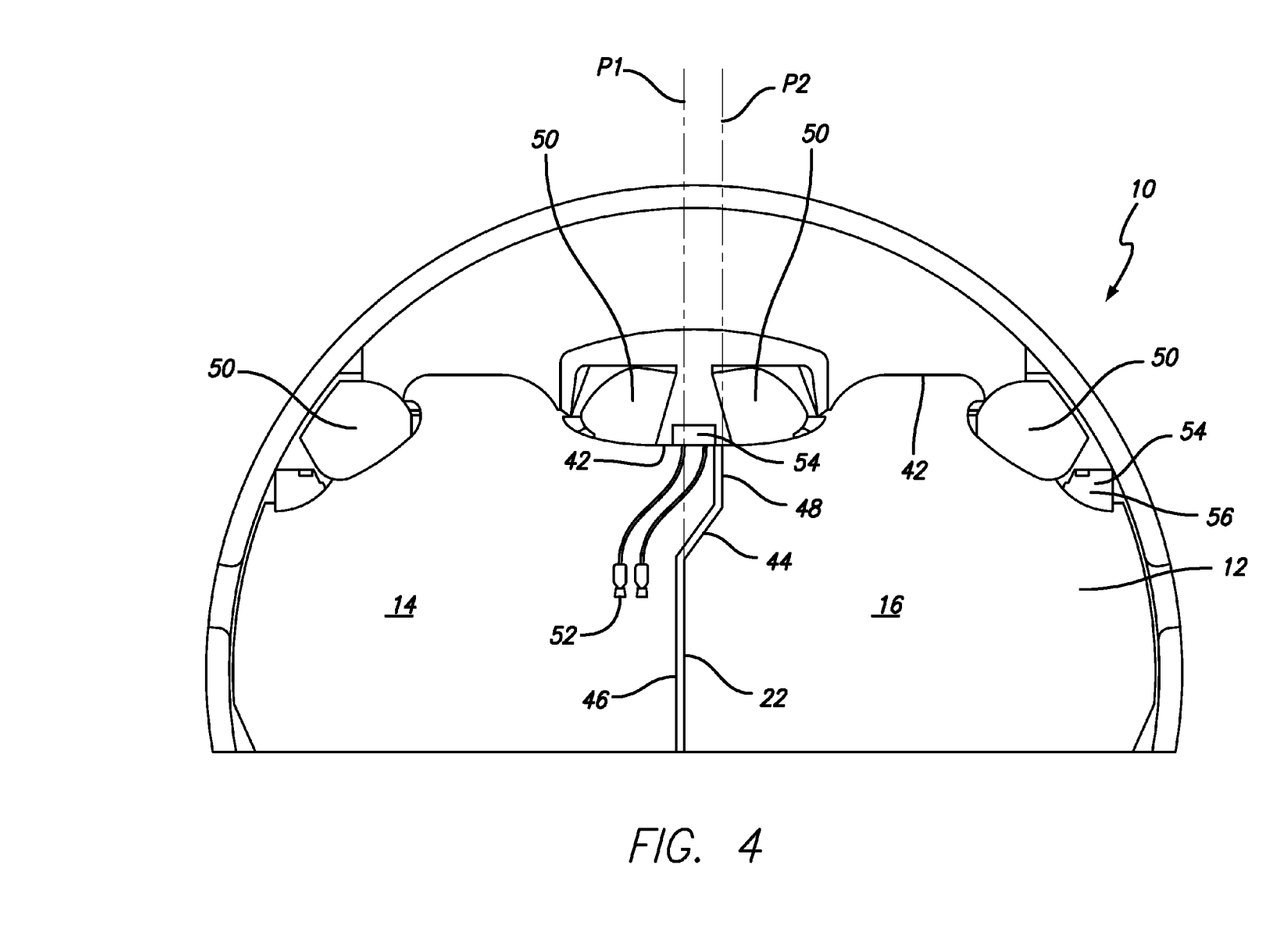
FIG. 4 is a schematic cross-sectional view of an aircraft showing the separation wall in accordance with a preferred embodiment of the present invention.

As is shown in FIG. 1, the cabin 10 includes a divider, separator or separation wall 22 that extends longitudinally along at least a portion of the cabin 12. Preferably, the separation wall 22 extends from the floor to the ceiling 42 of the cabin 10, so that the first class section 14 is completely secluded from the other seating sections. FIG. 4 shows an exemplary embodiment of the separation wall 22. FIG. 4 is a cross-sectional view of an aircraft 12 that includes typical cabin components such as overhead bins 50, oxygen masks 52 and passenger service units 54. As shown in FIG. 4, the ceiling 42 includes therein an oxygen mask compartment 56 that houses the oxygen masks 52 when not deployed. It will be appreciated by those skilled in the art that these components are not a limitation on the present invention and may be different in different aircraft. It will further be understood that as used herein, "ceiling" means the overhead interior surface of the cabin. In other words, when the separation wall 22 extends from the floor to the ceiling 42, as shown in FIG. 4, a passenger outside of the first class section 14 cannot see over the wall 22. However, in this embodiment, the "ceiling" is the housing for the overhead bins 50.

As shown in FIG. 4, in a preferred embodiment, wall 22 includes an offset portion 44 that angles away from the first class section 14. This helps in to ensure that the oxygen masks 52 fall to the appropriate passengers, as is shown in FIG. 4. In a preferred embodiment, the separation wall 22 includes a vertically extending floor portion 46, the offset portion 44, and a vertically extending ceiling portion 48. The ceiling 42 includes an oxygen mask compartment 56 defined therein. As shown in FIG. 4, a first vertical plane P1 defined by the floor portion 46 extends through the oxygen mask compartment

56, and a second vertical plane P2 defined by the ceiling portion 48 does not extend through the oxygen mask compartment 56. This allows the door or cover (not shown) of the oxygen mask compartment 56 to open. Essentially, the second vertical plane P2 does not extend through the door or cover of the oxygen mask compartment 56. This arrangement is not a limitation on the present invention. In another embodiment, the wall 22 can be positioned such that the vertical plane defined by the floor portion 46 does not extend through the oxygen mask compartment 56. In another embodiment, the ceiling portion 48 can be omitted and the offset portion 44 can extend to the ceiling 42. In another embodiment, offset portion 44 can be omitted and the wall 22 can be straight. Other shapes of wall 22 are within the scope of the present invention.

Figure 3:
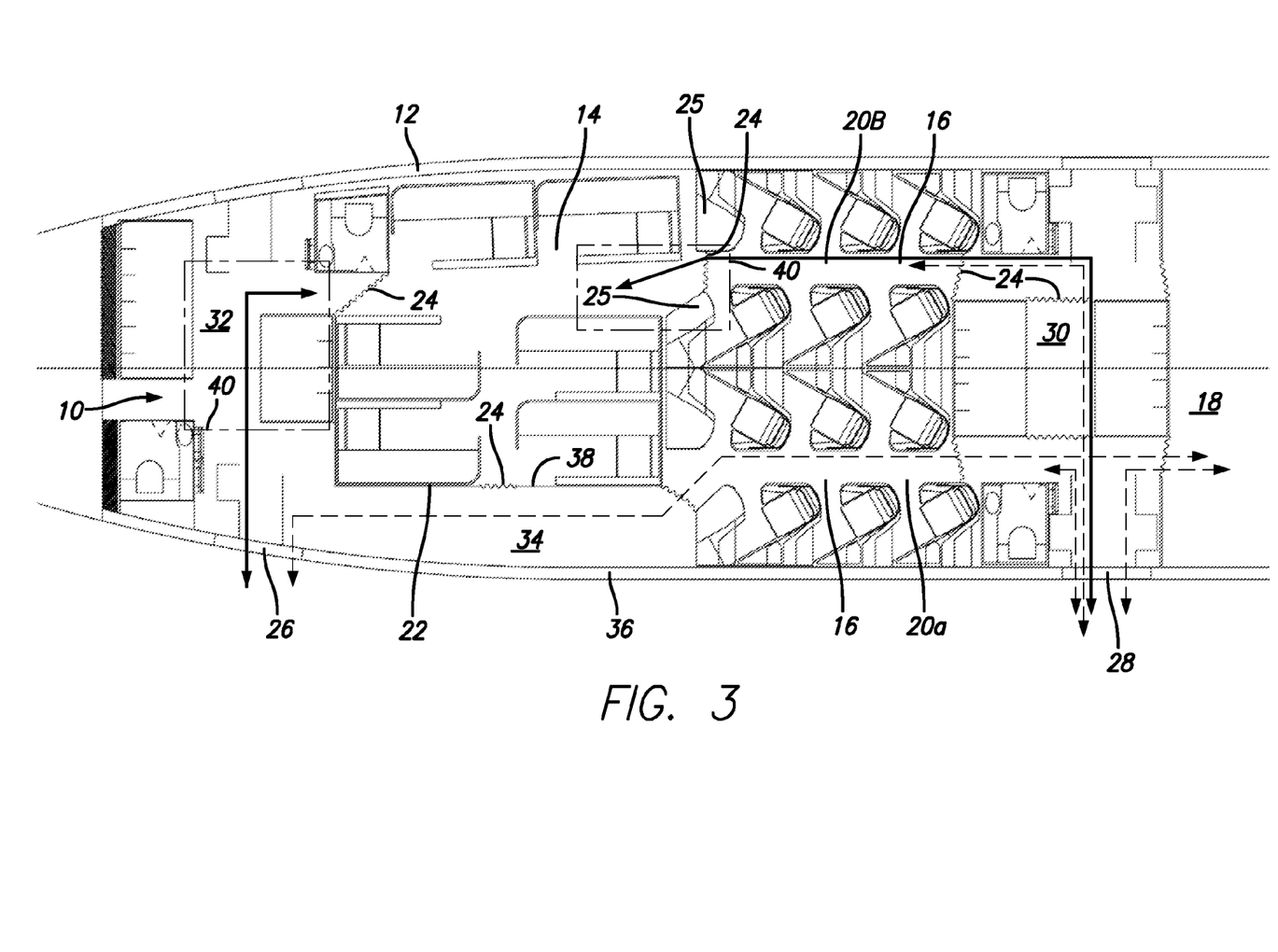
FIG. 3 is a top plan view of an aircraft with another separate first class seating section in accordance with a preferred embodiment of the present invention.

In another embodiment, wall 22 may extend to a height that does not reach the ceiling. In the embodiment shown in FIG. 1, wall 22 extends down the longitudinal center line or axis of the aircraft/cabin. However, as shown in FIG. 3, this is not a limitation on the present invention. In a preferred embodiment, wall 22 prevents the business and economy class passengers traveling down aisle 20*a* from seeing into first class section 14, thus not disturbing the first class passengers during boarding or at any other part of the flight. Curtains 24 can be used to provide increased privacy for the first class seating section 14.

As will be understood by those skilled in the art, different types of aircraft have different entrances. FIG. 1 shows an aircraft with a fore entrance 26 positioned forward of all seating classes, and a middle entrance 28 positioned between the first and business class sections 14 and 16 and the economy class section 18. Many aircraft also include an aft entrance (not shown).

Exemplary boarding paths for economy and business class passengers will now be described. It will be understood that these boarding paths are not exclusive and those of skill in the art will recognize other boarding paths. What is important is that none of these boarding paths go through the first class section 14. Furthermore, it will be understood that in these embodiments, the first, business and economy sections are all on the same level. In other words, there are no seats positioned on a second level, such as on a Boeing 747. The economy and business class boarding paths are shown with dashed arrows and the first class boarding paths are shown with solid arrows. To get to their seats, economy class passengers entering through the fore entrance 26 turn right, travel down aisle 20*a* through business class section 16 and to economy class section 18. To get to their seats, economy class passengers entering through the middle entrance 28 turn right and enter economy class section 18. To get to their seats, port side business class passengers entering through the fore entrance 26 turn right and travel down aisle 20*a* to their seat in the port side business class section 16. To get to their seats, starboard side business class passengers entering through the fore entrance 26 turn right to travel down aisle 20*a*, then turn left to travel through laterally extending passageway 30, then turn left to travel down aisle 20*b* to their seat in the starboard side business class section 16. These passengers are prevented from travelling through the first class section 14 to get to their seat. To get to their seats, port side business class passengers entering through the middle entrance 28 turn left to travel down aisle 20*a* to their seat in the port side business class section 16. To get to their seats, starboard side business class passengers entering through the middle entrance 28 travel through passageway 30, then turn left to travel down aisle 20*b* to get to their seat in the starboard side business class section 16. It will be appreciated by those skilled in the art that any business or economy class passengers entering through the aft entrance will go down one of the aisles 20 to their seats, without passing through the first class section 14.

Exemplary boarding paths for first class passengers will now be described. It will be understood that these boarding paths are not exclusive and those of skill in the art will recognize other boarding paths. To get to their seats, first class passengers entering through the fore entrance 26 travel through laterally extending passageway 32, and then turn right to travel down aisle 20*b* to their seat. To get to their seats, first class passengers entering through the middle entrance 28 travel through passageway 30, then turn left to travel down aisle 20*b* through the starboard side business class section 16 and to their seat in the first class section 14.

Figure 2:
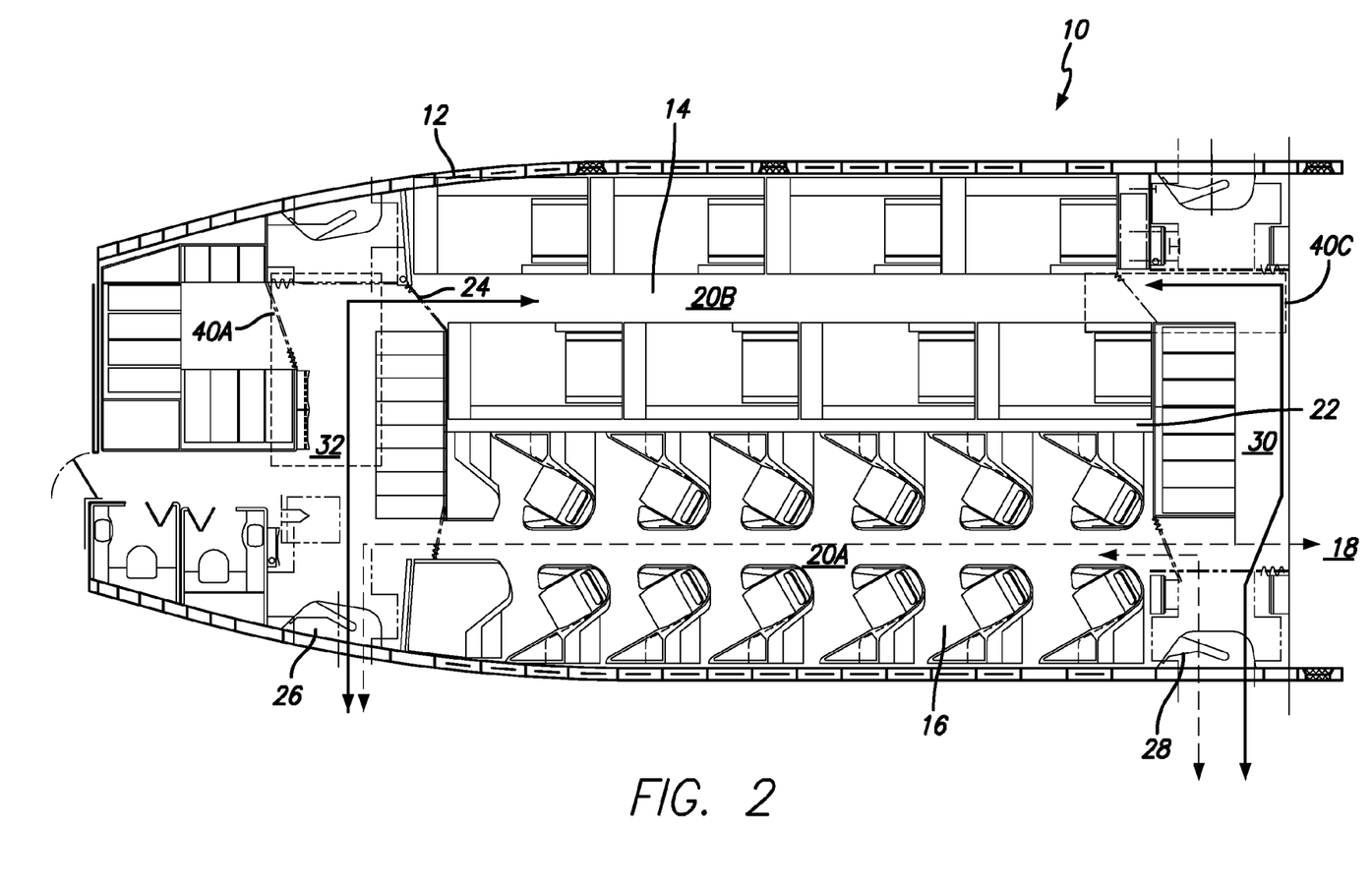
FIG. 2 is a top plan view of an aircraft with another separate first class seating section in accordance with a preferred embodiment of the present invention.

FIG. 2 shows a similar configuration as FIG. 1, but with the business class seats on the starboard side of the aircraft and laterally extending passageway 30 omitted. In this embodiment, as shown in FIG. 2, the first class section 12 can only be entered from the front. This layout includes a door on the starboard side of the aircraft at the back of the first class section 12. However, as is known in the art, jet aircraft are always boarded from the port side of the aircraft.

In FIG. 3, some port side window seating is omitted and the first class section 14 extends from the starboard side into the port side of the cabin. This embodiment includes a longitudinally extending passageway 34 that is at least partially defined by the port side wall and windows 36 and wall 22. Passageway 34 leads business and economy class passengers passed the first class section 14 and to aisle 20*a* in the business class section 16. As shown in FIG. 3, in a preferred embodiment, wall 22 includes an opening 38 therein for entering or exiting the first class section 14. During boarding, this opening 38 is closed by a curtain 24, door or the like. During flight, the curtain 24 can be opened so that first class passengers can gather in passageway 34, which can be converted to a lounge and include a bar or the like. Therefore, passageway 34 can serve one purpose during boarding and exiting and another during the flight.

Figure 5:
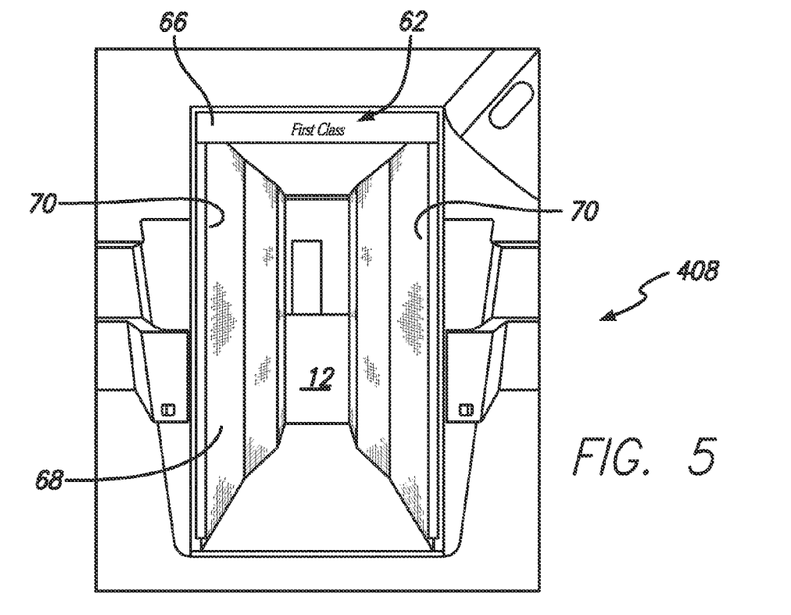
FIG. 5 is a perspective view showing a grand entrance in accordance with a preferred embodiment of the present invention.
Figure 6:
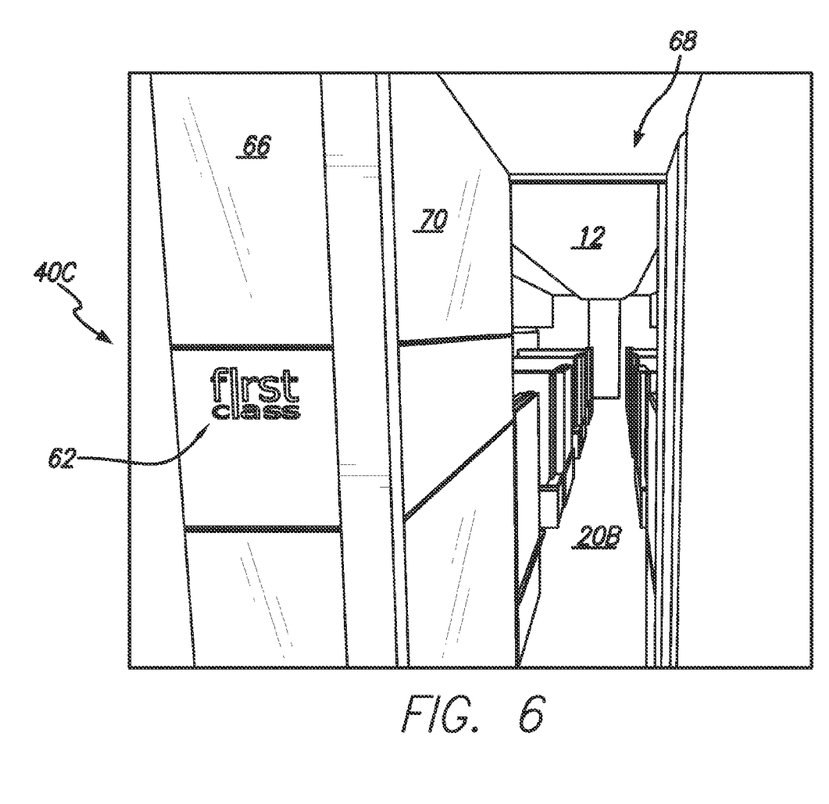
FIG. 6 is a perspective view showing another grand entrance in accordance with a preferred embodiment of the present invention.
Figure 7:
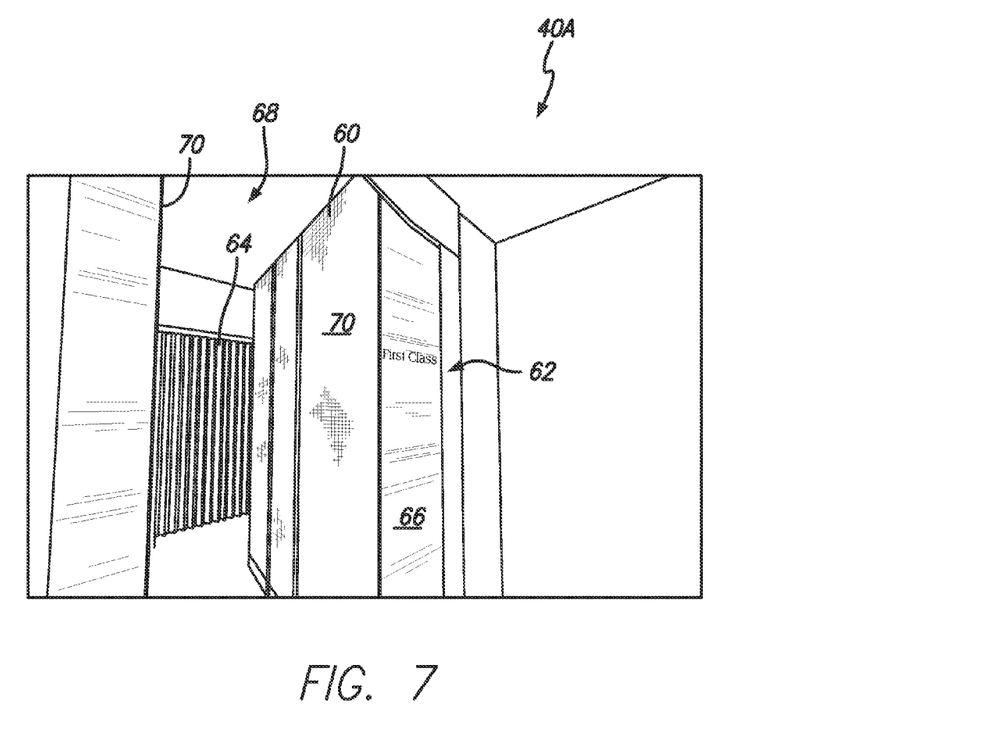
FIG. 7 is a perspective view showing another grand entrance in accordance with a preferred embodiment of the present invention.

As shown in FIGS. 1-3 and 5-7, in a preferred embodiment, the first class section 14 includes at least one "grand entrance" 40 (referred to herein generally as 40 and showing specific examples 40A-40C in FIGS. 5-7). The grand entrances 40 mark the entrance to the first class section 14 and signify the opulence and elegance thereof. As will be appreciated, the grand entrances 40 can be more ornate or decorative compared to the plain thresholds of the entrances to the business and economy class sections 16 and 18, which are typically marked only with a curtain. For example, as shown in FIGS. 4-7, the grand entrances 40 can include decorative functional elements, such as lights, tiling 60, wood paneling, signs 62, blinds 64 that can be opened and closed to hide portions of the aircraft when desired, and a frame or gate 66 through which the first class passengers pass.

FIGS. 5-7 show examples of grand entrances 40A-40C. In a preferred embodiment, the grand entrance 40 includes or is part of a vestibule or corridor 68, that separates the grand entrance 40 from the first class section 14. The vestibule 68 is preferably comprised of opposing walls 70. The opposing walls 70 can be the side or part of monuments or other elements of the aircraft. For example, the walls 70 can be part of the outer wall/privacy shell of the first class seating, bulkheads, lavatory or galley monuments, etc. Preferably, the opposing walls 70 extend all the way to the ceiling.

In another embodiment, the first class section can be located on the port side of the aircraft. The boarding paths for this configuration will be readily apparent to those of ordinary skill in the art.

The particular arrangement shown in the figures and described herein is intended to be only one example of a boarding path arrangement or configuration incorporating the principles of the invention. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further any specific numbers noted herein are only examples: alternative implementations may employ differing values or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft comprising:
   a cabin having a floor, side walls, a ceiling and an interior,
   a first class section positioned in the interior that includes a longitudinally extending first aisle extending therethrough,
   a first door positioned fore of the first class section,
   an economy class section positioned in the interior, wherein at least a portion of the economy class section is positioned aft of the first class section, and
   a longitudinally extending second aisle that extends parallel to the first aisle, wherein the second aisle does not extend through the first class section,
   wherein an economy class passenger that enters through the first door travels down the second aisle to enter the economy class section.

2. The aircraft of claim 1 further comprising a longitudinally extending wall that separates the second aisle from the first class section.

3. The aircraft of claim 2 wherein the longitudinally extending wall extends from the floor to the ceiling.

4. The aircraft of claim 3 wherein the longitudinally extending wall includes an offset portion.

5. The aircraft of claim 4 wherein the longitudinally extending wall includes a vertically extending floor portion, the offset portion, and a vertically extending ceiling portion.

6. The aircraft of claim 5 wherein the ceiling comprises an oxygen mask compartment, wherein the floor portion of the longitudinally extending wall defines a first vertical plane and the ceiling portion defines a second vertical plane, wherein the first vertical plane extends through the oxygen mask compartment and the second vertical plane does not extend through the oxygen mask compartment.

7. The aircraft of claim 1 further comprising a grand entrance positioned between the first door and the first class section, wherein the grand entrance includes a frame and a vestibule that comprises a walkway defined by opposing walls, and wherein one or both of the frame and the opposing walls include decorative functional elements thereon.

8. The aircraft of claim 1 further comprising a business class section, wherein the second aisle extends through at least a portion of the business class section and at least a portion of the economy class section.

9. An aircraft comprising:
   a cabin having a floor, side walls, a ceiling and an interior,
   a first class section positioned in the interior, wherein the first class section includes a longitudinally extending first aisle extending therethrough,
   a business class section positioned in the interior that includes a longitudinally extending second aisle extending therethrough, wherein the longitudinally extending second aisle extends parallel to the first aisle and does not extend through the first class section,
   a first door positioned fore of the first class section and the business class section, and
   an economy class section positioned in the interior, wherein at least a portion of the economy class section is positioned aft of the first class section and the business class section,
   wherein a first class passenger that enters through the first door travels down the first aisle to enter the first class section,
   wherein a business class passenger that enters through the first door travels down the second aisle to enter the business class section, and
   wherein an economy class passenger that enters through the first door travels down the second aisle to enter the economy class section.

10. The aircraft of claim 9 further comprising a longitudinally extending wall that separates the second aisle from the first class section.

11. The aircraft of claim 1 wherein the longitudinally extending wail extends from the floor to the ceiling.

12. The aircraft of claim 11 further comprising a grand entrance positioned between the first door and the first class section, wherein the grand entrance includes a frame and a vestibule that comprises a walkway defined by opposing walls, and wherein one or both of the frame and the opposing walls include decorative functional elements thereon.

13. An aircraft comprising:
a door through which passengers enter the aircraft,
a secluded first class section, wherein the first class section includes a longitudinally extending first aisle extending therethrough,
an economy class section positioned in the interior,
a grand entrance positioned between the door and the first class section, wherein the grand entrance includes a frame and a vestibule that comprises a walkway defined by opposing walls, and wherein one or both of the frame and the opposing walls include decorative functional elements thereon, and
a longitudinally extending second aisle that extends parallel to the first aisle and that does not extend through the first class section, wherein an economy class passenger that enters through the door travels down the second aisle to enter the economy class section.

14. The aircraft of claim 13 wherein the longitudinally extending second aisle extends through at least a portion of the business class section and at least a portion of the economy class section.

15. The aircraft of claim 14 wherein neither the business class section nor the economy class section include a grand entrance.

* * * * *